Oct. 5, 1948.  O. K. REINHARDT ET AL  2,450,813
LEAKPROOF DRY CELL
Filed July 31, 1945

INVENTOR.
O. K. REINHARDT
T. F. FALLON
BY
Pennie Davis, Marvin & Edmonds
ATTORNEYS Patented Oct. 5, 1948

2,450,813

UNITED STATES PATENT OFFICE 2,450,813

LEAKPROOF DRY CELL

Otto K. Reinhardt and Thomas F. Fallon, New Haven, Conn., assignors to Olin Industries, Inc.

Application July 31, 1945, Serial No. 608,030

2 Claims. (Cl. 136—133)

This invention relates to dry cells and more particularly to a leakproof cell provided with a shell or jacket of molded plastic material surrounding the zinc can.

In the usual construction of dry cells, the outer container is a zinc can which forms one of the electrodes of the cell. In the use of the cell, the zinc is consumed and, if there are any irregularities in the zinc wall structure, it may be entirely consumed in one or more areas before the cell becomes exhausted. This permits the electrolyte mixture to leak from the cell and corrode the metallic parts of the flashlight casing in which the cells are used.

A further cause of leakage in cells of ordinary construction is the pressures created in the cell when it is short-circuited or under heavy load for a considerable period of time. The gases thus formed create pressure in the cell and force the paste-like electrolyte mixture from the top of the cell around the edge of the zinc can and around the central opening through which the carbon electrode extends, if the closure is of such type that leakage may occur.

It has been proposed to form a leakproof cell by placing an outer steel jacket over the cell and tightly crimping the upper and lower edges of the jacket to the upper and lower edges of the zinc can. While such construction is satisfactory for preventing leakage through the side wall of the cell when the zinc has been partially consumed, it does not prevent leakage at joints caused by electrolyte being forced from the cell due to pressures created by the formation of gas within the cell. Such construction depends entirely upon the efficiency of the ordinary cell closure to prevent this latter type of leakage.

In the present invention we have provided a leakproof cell construction in which the usual closure member characterized by a number of joints which tend to leak is omitted and a one-piece molded plastic cup is placed over the cell in inverted position with the free edge extending slightly over the bottom of the cell and secured thereto. The usual contact cap, which receives the carbon electrode, is embedded in the jacket when the latter is made and, as the top closure is integral with the side wall of the jacket, leakage around the upper edge of the zinc can is also prevented. If any portion of the wall of the zinc can is entirely consumed, flow of the electrolyte into the flashlight casing is prevented by the wall of the jacket.

In the accompanying drawing we have shown several embodiments of the invention. In this showing:

Figure 1:
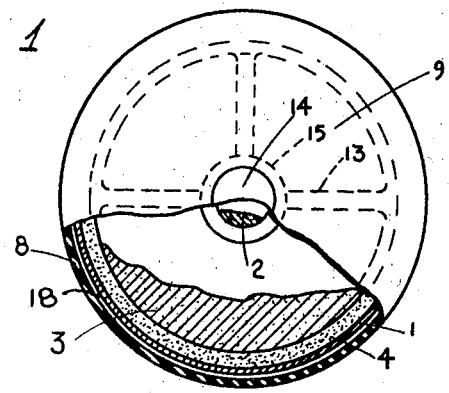
Fig. 1 is a plan view of the cell, parts being shown in section.
Figure 2:
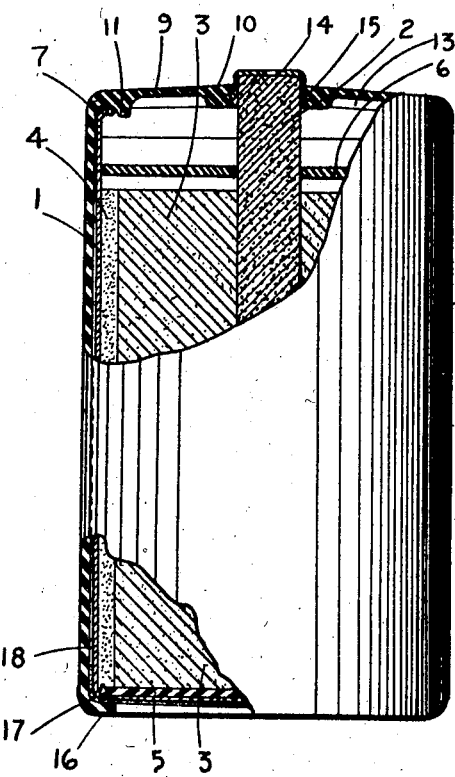
Fig. 2 is a front elevation, parts being shown in section.

Referring to Figs. 1 and 2 of the drawing, the reference numeral 1 designates the zinc can of a dry cell which is of conventional construction in which is arranged a carbon pencil 2 preferably disposed centrally thereof as is conventional in the construction of dry cells, the zinc and carbon forming the two electrodes of the cell.

The carbon electrode is surrounded by the usual core 3 of the depolarized material, which is slightly spaced from the zinc can as shown and the electrolyte paste 4 is placed between the depolarizing mix and the zinc electrode as is the conventional practice. An insulating washer 5 is arranged in the bottom of the zinc can and a waterproof washer 6 is arranged above the depolarizing mix and slightly spaced from the top of the can. The upper edge of the can is turned inwardly as at 7.

The jacket employed to produce a leakproof cell comprises a one-piece molded plastic cup 8. In constructing cells embodying the invention we have formed the jackets by injection molding. Any suitable plastic material may be employed for this purpose. We have employed a cellulose acetate-butyrate composition but other thermoplastics, such as ethyl cellulose, vinyl chloride-acetate copolymers, polystyrene and polymethacrylates may be employed. As stated, the jacket is substantially in the form of a cup and is placed over the cell in inverted position. The closed end 9 which forms the top closure of the cell is provided with a central circular bead 10. A bead 11 is spaced from the bead 10 and forms a groove for the reception of the inwardly curled edge 7 of the zinc can as shown in Fig. 2. A plurality of radially disposed strengthening ribs 13 connect the two beads. The metal cap 14, which normally is arranged at the end of the carbon pencil and serves as one of the cell terminals, is molded into the plastic cup. Such caps are generally provided with a flange or skirt 15 and this flange or skirt is disposed within the bead 10 to provide a pressure-tight construction. The free edge of the cup 8 is turned inwardly over the bottom of the zinc can as indicated at 16 and is secured to the zinc can around its entire periphery by a suitable adhesive 17. Preferably the plastic cup is of such size that an air chamber of about .005" is formed between the zinc can and the plastic cup, as indicated at 18.

In constructing the cell, the metal cap 14 is first placed in the mold and the jacket molded with the cap embedded in the bead 10, as shown. The bottom washer 5, the core containing the carbon pencil and the electrolyte paste are successively inserted in the zinc can. The top washer 6 is then placed in position and the electrolyte gelatinized. The upper edge of the can is then turned inwardly as indicated at 7. The plastic jacket 8 is then slipped over the can until the carbon electrode contacts the bead 10. The cover 9 is then brought into contact with a die heated by steam at about 25 pounds per square inch and after several seconds, pressure is applied to the bottom of the zinc can to force the carbon electrode into the metal cap 14. The base of the assembled can and jacket are placed in a die heated as described above for about several seconds. Pressure applied during the heating causes the lower edge of the plastic jacket to be turned inwardly over the outer area of the bottom of the zinc can and to be secured to the zinc can. An effective seal is obtained by the provision of a layer of adhesive or cement, as shown at 17, which is resistant to the electrolyte and which is strongly bonded to the zinc and jacket surfaces, consisting for example of a composition based on a thermoplastic such as a vinyl chloride-acetate copolymer. The cement may be initially applied to the surface of either or both the zinc can and the jacket, but is preferably initially applied to the inner surface adjacent the edge of the jacket, followed by removal of volatile solvent, prior to the assembly operations.

Figure 3:
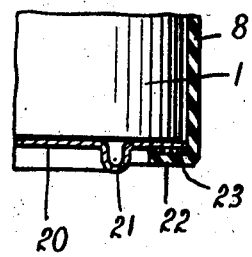
Fig. 3 is a detailed, sectional view of the bottom portion of a cell showing a modified form of the invention.
Figure 4:
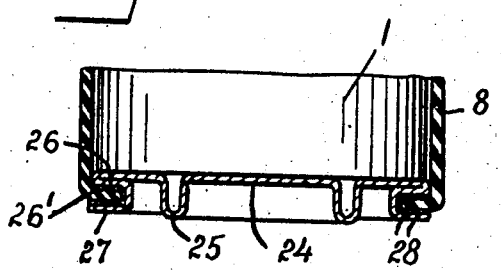
Fig. 4 is a similar view showing a further modification.

In Figs. 3 and 4 of the drawing we have shown cells constructed substantially as shown in Figs. 1 and 2 but provided with a double bottom. This double bottom gives increased strength to the cell but is employed primarily because it is constructed of a metal other than zinc, such as tin plated steel, to which the plastic jacket can be more readily secured by means of an adhesive. As shown in Fig. 3, beneath the zinc can 1 we place a disc 20, preferably of tin plated steel, in direct contact with the bottom of the can to form a terminal of the cell. The disc is preferably provided with a circumferential rib or bead 21 slightly spaced from its outer edge. The bottom of the plastic jacket is extended over the peripheral portion of the disc between the bead and the outer edge as shown at 22 and secured thereto by a layer 23 of cement. The assembled cell is placed in a suitable die as heretofore described to secure the jacket to the peripheral portion of the disc.

In the form of the invention shown in Fig. 4 of the drawing, we employ a metal disc 24, preferably of tin plated steel, having a circumferential rib 25 and having its edge portion extended inwardly as at 26. After the bottom of the plastic jacket 8 has been extended over the bottom of the cell, as indicated at 26', the cell assembly is completed in a suitable die as heretofore described, the portions 26 and 27 of the disc and the edge of the jacket being connected by a layer of cement, as indicated at 28.

It will be noted that the bottom of the cell is exposed as in conventional flashlight cells to permit the cells to be used in tandem with the contact cap of one cell engaging the bottom of the adjacent cell to form an electrical connection. The construction herein shown is very effective for producing leakproofness. Because of the bottom washer 5 insulating the bottom of the zinc can from the depolarizing mix, corrosion of the zinc very seldom occurs on the bottom of the can. The side walls, however, are fully enclosed by the body portion 8 of the plastic jacket so that if localized corrosion of the zinc causes the zinc wall to be eaten through in one or more places, the electrolyte is prevented from flowing into the flashlight casing to cause corrosion of the metal parts. Also by forming the closure integrally with the jacket, leakage due to pressures within the cell is prevented. The chamber 18 between the zinc can and the outer jacket serves for relief of excessive pressure if, due to some unusual condition, excessive pressure is created in the cell. The outer bead 11 not only provides needed strength for the top closure, but also facilitates assembly by forming a groove for the reception of the upper curled edge of the zinc can. By eliminating any top closure other than that formed by the closed end of the jacket, a slightly shorter zinc can can be employed than is now used in a standard cell of the same capacity.

We claim:
1. A leakproof cell comprising a zinc can forming an outer electrode, a carbon electrode arranged in the can and projecting slightly therefrom, a preformed jacket of insulating material surrounding the zinc can, the jacket being in the form of a cup with its closed end forming the cell closure, the upper edge of the zinc can being curved inwardly, the edge of the jacket being secured to the bottom of the cell adjacent its outer edge, a central circular bead in the closed end of said jacket, a contact cap arranged in the said bead and adapted to receive the end of the carbon electrode, and a second bead formed in the closed end of the jacket forming a groove between the bead and the wall of the jacket for the reception of the curved edge of the zinc can.

2. A leakproof cell comprising a can forming an outer electrode, a carbon electrode arranged in the can and projecting slightly therefrom, a preformed plastic jacket of insulating material surrounding the outer electrode, the jacket being in the form of a cup with its closed end forming the cell closure, the upper end of the can being curved inwardly, the edge of the jacket being secured to the bottom of the cell adjacent its outer edge, a central circular bead in the closed end of said jacket, a contact cap arranged in said bead and adapted to receive the end of the carbon electrode, and a second bead formed in the closed end of the jacket forming a groove between the bead and the wall of the jacket for the reception of the curved end of the can, the edge of the jacket being secured to the bottom of the can by a thermoplastic cement.

OTTO K. REINHARDT.
THOMAS F. FALLON.

REFERENCES CITED

The following references are of record in the file of this patent:

UNITED STATES PATENTS

| Number | Name | Date |
|---|---|---|
| 2,346,640 | Anthony | Apr. 18, 1944 |
| 2,392,795 | Anthony et al. | Jan. 8, 1946 |
| 2,399,089 | Anthony | Apr. 23, 1946 |
| 2,427,561 | Keller | Sept. 16, 1947 |
| 2,427,914 | Koretzky et al. | Sept. 23, 1947 |

OTHER REFERENCES

"Plastics," page 11, August 1944.